June 6, 1967 — R. W. GOTHAM — 3,323,636
LIVE ROLLER CONVEYOR
Filed Sept. 1, 1965
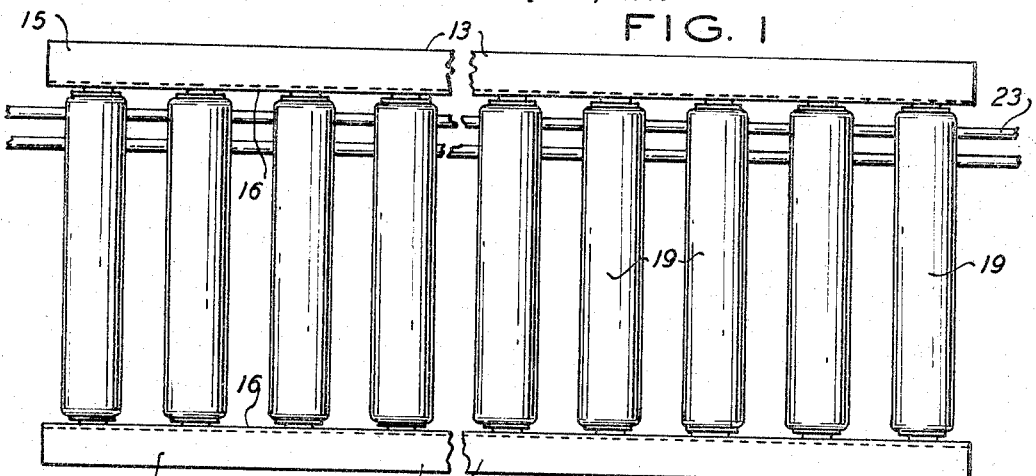
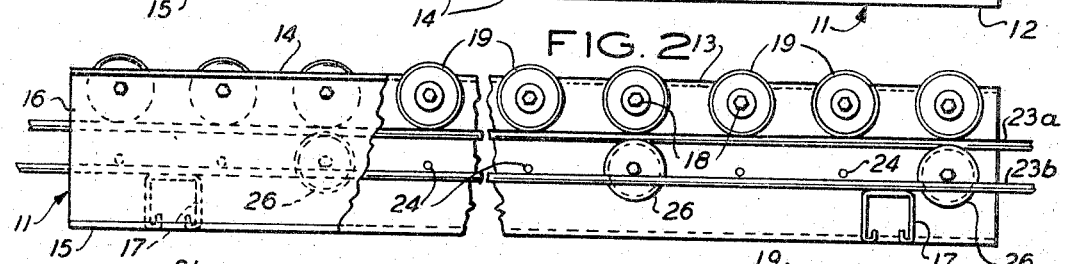
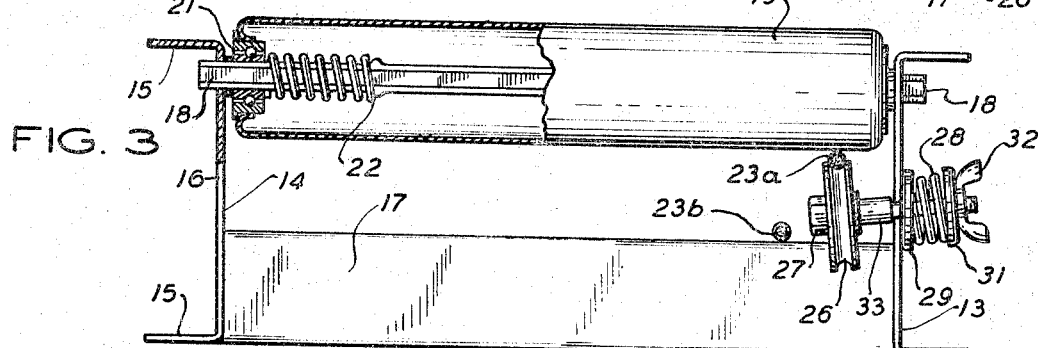
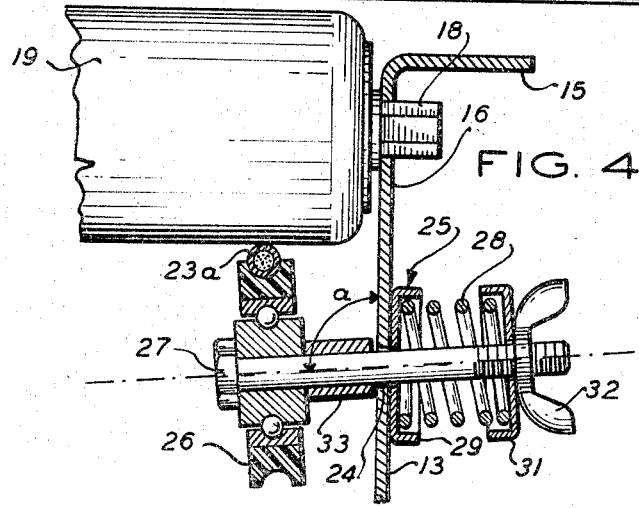
INVENTOR
ROBERT W. GOTHAM
BY Towson Price
ATTORNEY United States Patent Office 3,323,636
Patented June 6, 1967

3,323,636
LIVE ROLLER CONVEYOR
Robert W. Gotham, 98 Mountain Ave.,
Summit, N.J. 07901
Filed Sept. 1, 1965, Ser. No. 484,186
8 Claims. (Cl. 198—127)

This invention relates to powered roller conveyors, wherein a series of parallel rollers is driven from below by a contacting moving belt and, more particularly, to a type which uses a driving belt of circular, square, or V cross-section. Such types of belts are more readily guided or tracked by grooved rollers, whereas a flat belt as commonly used in live roller conveyors must be tracked over crowned pulleys which require accurate adjustment to prevent belt wandering.

An object of my invention is to provide a conveyor of this type having a novel arrangement of pressure rollers, whereby a predetermined driving force may be applied to roller driving means through a belt independently of variations in the tension of the belt.

Another object of my invention is to minimize the flexing of the driving belt and thereby reduce the consumption of power while prolonging the life of said belt.

A further object of my invention is to compress the belt against certain of the driven rollers by means of spring-actuated pulleys which limit the frictional driving force on the several driven rollers and cause the belt to follow a substantially straight path between them.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In all conveyors of this live roller type, a certain force or pressure between the moving belt and driven rollers is required to transport an item resting on the driven rolls. This force depends on the coefficient of friction between the moving belt and the driven rollers, and the weight and roughness of the bottom surface of the item being conveyed. Under ideal conditions this force should be only great enough to move the heaviest item to be conveyed. Excess force between the moving belt and driven rollers results in unnecessary power consumption, extra wear to the belt and rollers, and excess driving force to the conveyed item. This last result is undesirable if for any reason the conveyed article is caused to stop while the driven rollers are powered.

In order to attain the exact force between the moving belt and the driven rollers which is needed for proper conveying, some means providing a constant force are required. This invention shows such means which are extremely low in cost and are readily adjustable to increase or decrease the driving force. In addition, they may be easily installed in an existing powered roller conveyor in place of less adjustable means, or may be used to convert an existing roller conveyor of non-powered type to a powered roller conveyor.

In the drawings, wherein like reference characters denote like parts in the several views:

FIGURE 1 is a plan view of a short section of roller conveyor showing the moving belt, in this case of circular cross section.

FIGURE 2 is a fragmentary side view of the conveyor of FIGURE 1 showing typical belt-supporting means under every third roller.

FIGURE 3 is a fragmentary end view of the conveyor of FIGURE 1, showing one belt-supporting means holding the moving cable in contact with a driven roller.

FIGURE 4 is a cross sectional view to a larger scale of one of the belt-supporting means holding the moving cable in contact with a driven roller.

Referring to the drawings in detail, there is disclosed a conveyor generally designated 11, comprising a frame 12 formed of laterally spaced preferably parallel structural members 13 and 14, here shown as channels, each with generally horizontal flanges 15 outstanding from the web 16 thereof. Cross members 17, here shown as downwardly opening channels, extend between and have ends fixed to the lower portion of the side frame or structural members 13 and 14 to provide the rigid frame 12. The normally vertical webs 16 of the members 13 and 14 are apertured, as by punching, to receive the axles 18 of driven rollers 19. The rollers 19 are provided with ball or other anti-friction bearings 21 at their ends.

Each roller axle 18 is shown as retained within its roller by a spring 22, although cotter pins or other means to retain the axle are acceptable. An endless belt 23 of circular cross section in shown with a top pass 23a and a bottom pass 23b which may be supported by the cross members 17, as illustrated in FIGS. 2 and 3. This belt is powered by conventional means, not shown.

One of the channels such as that designated 13 is provided with a second series of holes 24. These are shown directly below each of the axles 18, although they may also be located between these axle holes, but all on the same line or horizontal plane. Adjustable belt-supporting assemblies 25 are provided, each consisting of a grooved wheel or pulley 26 free to rotate on a shaft 27 which passes through a hole 24 in the web 16 of said channel 13 and also through a coiled compression spring 28.

Each spring 28 is centered around its shaft 27 by spring end caps 29 and 31. A desirably wing nut 32 is threaded on shaft 27 to adjustably hold the assembly 25 in place. A hollow cylindrical spacer 33 is provided to hold the pulley 26 a fixed distance from the web 16 of the channel 13 by virtue of the shaft 27 passing therethrough and the fact that it is disposed between the pulley 26 and said channel.

FIGURE 4 illustrates that each hole 24 and the received shaft 27 are located at such a distance below its overlying axle 18, that the angle "a" between the vertical web 16 of the channel and the center line of the shaft 27 is in excess of 90°, with the top pass 23a of the belt 23 in position in the groove of the wheel 26. The value of the angle "a" which is acceptable is normally 95°.

In operation, an increase in the tension on the spring 28, due to manually or otherwise tightening the nut 32 on shaft 27, tends to force the shaft 27 to assume a right angle with respect to the vertical web 16 of the channel or side rail 13. This results in an increase in pressure between the moving belt 23 and the bottom of the driven roller 19 thereabove, and a constant increase of the driving force whch is applied to this roller 19. A decrease in said spring tension has the opposite effect, whereby it is possible to regulate the pressure of the belt on the so-controlled roller or rollers to the extent desired.

For normal package conveying, an adjustable wheel assembly 25 under every other roller 19 provides adequate driving force. With long, light-weight items the assembly under every third or fourth roller 19 is sufficient. Where higher driving force is desired, an assembly 25 may be mounted under each driven roller 19. Each wheel 26 is made of suitable material, including a peripheral portion and body of nylon nor the like, with a metal hub carried on a metal washer or spool riding on the shaft 27. The belt 23 may be metal, including steel, with a sheath of nylon or the like.

Although this is not essential, the axles 18 are illustrated as hexagonal in section non-rotatably slidable in the correspondingly shaped receiving apertures in the web 16, and normally slidable axially within the inner races of the anti-friction bearings 21 at their ends. One end portion of each axle 18 is encircled by a coil spring 22, held in place between the inner race of the adjacent bearing 21 and stop means on the axle. Such means may be an upset portion thereof or a cotter pin passing therethrough. Movement of an axle to the left with respect to its roller 19, from the position of FIGURE 3 for applying or removing said roller, is thus permitted upon compression of the spring 22. Such relative movement of the axle to the right is prevented by a stop on said axle, not shown, adjacent the inner race of right hand bearing 21, not shown.

It will be readily seen from the above that an extremely wide range of driving force is available by varying the spacing of the belt supporting wheels and by adjustment of the spring tension of each wheel assembly. Installation is simple, requiring only a single hole in the side frame. The cost of each assembly is far below that of the rollers in common use.

Having now described my invention in detail in accordance with the requirements of the patent statutes, those skilled in this art will have no difficulty in making changes or modifications in the individual parts or their relative assembly in order to meet specific requirements or conditions. Such changes and modifications may be made without departing from the scope and spirit of the invention, as set forth in the following claims.

I claim:

1. A conveyor comprising laterally spaced side rails each having a normally vertical web and a flange extending from an edge thereof, a plurality of axles extending between said side rails, a roller rotatably mounted on each axle and adapted to carry articles to be moved by said conveyor, a belt with a top pass for driving said rollers while in direct engagement therewith and a bottom pass therebeneath, a shaft passing through an aperture in the web of a side rail, a wheel rotatably carried by said shaft below a roller, said wheel having a peripheral groove in which said belt travels, the position of the shaft in the web being such that said shaft, when the parts are assembled, makes an angle in excess of 90° with the part of said web thereabove, and means variably exerting resilient force on said shaft in a generally horizontal direction to tend to draw it into right angular relationship with respect to said web, for adjusting the upward pressure of the wheel on said belt to control the force driving said roller.

2. A conveyor as recited in claim 1, wherein the axles are generally parallel, uniformly spaced, and extend between the normally vertical web portions of said side rails.

3. A conveyor as recited in claim 1, wherein the grooved portion of said wheel is formed of nylon and the belt has a metal core covered by a nylon sheath, to minimize wear between said belt and the parts which it engages.

4. A conveyor as recited in claim 1, wherein there are cross members extending between and with ends fixed to the lower portions of said side rails, and the bottom pass of the belt is supported on said cross members.

5. A conveyor as recited in claim 1, wherein there is a spacer carried by said shaft and disposed between the wheel and said web.

6. A conveyor as recited in claim 5, wherein there is a spring mounted on said shaft on the opposite side of said web from said spacer, and end caps confining said spring on said shaft so that one of said caps is pushed against the web by said spring.

7. A conveyor as recited in claim 6, wherein the tension on said spring is adjustable by means of a nut threaded on said shaft outside of the outer spring cap.

8. A conveyor as recited in claim 7, wherein the angle said shaft makes with the part of said web thereabove is normally about 95°, so that turning of the nut, to increase the pressure of the end caps on the spring, tends to swing the shaft toward a right-angular relationship with said web, thereby increasing the pressure of the belt on the engaged roller.

References Cited
UNITED STATES PATENTS

| | | | |
|---|---|---|---|
| 2,129,510 | 9/1938 | Taylor | 198—127 |
| 2,593,284 | 4/1952 | Ewell | 198—191 |
| 3,247,950 | 4/1966 | Roth | 198—127 |

EVON C. BLUNK, *Primary Examiner.*

EDWARD A. SROKA, *Examiner.*